United States Patent
Juttu et al.

(10) Patent No.: US 9,522,392 B2
(45) Date of Patent: Dec. 20, 2016

(54) PHOSPHOROUS PROMOTION OF ZEOLITE-CONTAINING CATALYSTS

(71) Applicant: Inaeris Technologies, LLC, Pasadena, TX (US)

(72) Inventors: Gopal Juttu, League City, TX (US); Kelsey Shogren, Houston, TX (US); Bruce Adkins, League City, TX (US)

(73) Assignee: Inaeris Technologies, LLC, Pasadena, TX (US)

( * ) Notice: Subject to any disclaimer, the term of this patent is extended or adjusted under 35 U.S.C. 154(b) by 46 days.

(21) Appl. No.: 14/211,776

(22) Filed: Mar. 14, 2014

(65) Prior Publication Data

US 2014/0275588 A1    Sep. 18, 2014

Related U.S. Application Data

(60) Provisional application No. 61/793,051, filed on Mar. 15, 2013.

(51) Int. Cl.

| | | |
|---|---|---|
| *C07C 1/00* | (2006.01) | |
| *B01J 29/85* | (2006.01) | |
| *C11B 3/02* | (2006.01) | |
| *B01J 37/28* | (2006.01) | |
| *B01J 29/06* | (2006.01) | |
| *B01J 29/40* | (2006.01) | |
| *B01J 37/00* | (2006.01) | |
| *C11B 13/00* | (2006.01) | |

(Continued)

(52) U.S. Cl.
CPC ............... *B01J 29/85* (2013.01); *B01J 29/06* (2013.01); *B01J 29/40* (2013.01); *B01J 37/0045* (2013.01); *B01J 37/28* (2013.01); *C10G 3/49* (2013.01); *C10G 45/12* (2013.01); *C11B 3/02* (2013.01); *C11B 13/00* (2013.01); *C11B 13/005* (2013.01); *B01J 2229/20* (2013.01); *B01J 2229/42* (2013.01); *C10G 2300/1011* (2013.01); *Y02P 30/20* (2015.11); *Y02W 30/74* (2015.05)

(58) Field of Classification Search
None
See application file for complete search history.

(56) References Cited

U.S. PATENT DOCUMENTS

| | | |
|---|---|---|
| 2,727,008 A | 12/1955 | Her |
| 3,617,524 A | 11/1971 | Conn |

(Continued)

FOREIGN PATENT DOCUMENTS

| | | |
|---|---|---|
| CN | 1608972 | 4/2005 |
| EP | 0187007 | 7/1986 |

(Continued)

OTHER PUBLICATIONS

PCT/US2015/020430—International Search Report and Written Opinion—dated May 29, 2015.

(Continued)

*Primary Examiner* — Deborah D Carr

(57) ABSTRACT

Disclosed are methods of making, and processes of using phosphorous-promoted zeolite-containing catalysts in the conversion of hydrocarbonaceous materials such as hydrocarbons and biomass. Such disclosed methods of making include: spray drying of the catalyst precursor slurry followed by phosphorous promotion of the resulting spray dried material.

12 Claims, 3 Drawing Sheets

(51) Int. Cl.
*C10G 45/12* (2006.01)
*C10G 3/00* (2006.01)

(56) References Cited

U.S. PATENT DOCUMENTS

| | | | |
|---|---|---|---|
| 3,752,772 | A | 8/1973 | Horzepa |
| 3,843,741 | A | 10/1974 | Yan |
| 3,867,308 | A | 2/1975 | Elliott, Jr. |
| 3,926,783 | A | 12/1975 | Wolk |
| 3,965,043 | A | 6/1976 | Stridde |
| 4,238,364 | A | 12/1980 | Shabtai |
| 4,356,113 | A | 10/1982 | Lim et al. |
| 4,409,092 | A | 10/1983 | Johnson et al. |
| 4,420,644 | A | 12/1983 | Huibers et al. |
| 4,423,299 | A | 12/1983 | Gurol et al. |
| 4,440,868 | A | 4/1984 | Hettinger et al. |
| 4,483,764 | A | 11/1984 | Hensley et al. |
| 4,584,091 | A | 4/1986 | Pine |
| 4,601,997 | A | 7/1986 | Speronello |
| 4,624,773 | A | 11/1986 | Hettinger et al. |
| 4,968,650 | A | 11/1990 | Chu et al. |
| 4,987,114 | A | 1/1991 | Suzukamo et al. |
| 5,171,921 | A | 12/1992 | Gaffney et al. |
| 5,190,902 | A | 3/1993 | Demmel |
| 5,194,412 | A | 3/1993 | Roberie et al. |
| 5,231,064 | A | 7/1993 | Absil et al. |
| 5,288,739 | A | 2/1994 | Demmel |
| 5,380,690 | A | 1/1995 | Zhicheng et al. |
| 5,456,821 | A | 10/1995 | Absil et al. |
| 5,536,852 | A | 7/1996 | Matsui et al. |
| 5,545,599 | A | 8/1996 | Pickering et al. |
| 5,958,818 | A | 9/1999 | Demmel |
| 6,103,949 | A | 8/2000 | Demmel et al. |
| 6,395,949 | B1 | 5/2002 | Drake et al. |
| 6,436,279 | B1 | 8/2002 | Colyar et al. |
| 6,479,421 | B1 | 11/2002 | Vierheilig |
| 6,566,293 | B1 | 5/2003 | Vogt et al. |
| 6,776,899 | B2 | 8/2004 | Lam et al. |
| 6,835,863 | B2 | 12/2004 | Chester et al. |
| 6,995,108 | B1 | 2/2006 | Flessner |
| 7,035,285 | B2 | 4/2006 | Holloway et al. |
| 7,217,676 | B2 | 5/2007 | Rodriguez et al. |
| 7,304,194 | B2 | 12/2007 | Ghosh et al. |
| 7,344,695 | B2 | 3/2008 | Xu et al. |
| 7,375,048 | B2 | 5/2008 | Smith et al. |
| 7,431,825 | B2 | 10/2008 | Vierheilig et al. |
| 7,442,664 | B2 | 10/2008 | Van Der Zon et al. |
| 7,517,827 | B2 | 4/2009 | Ravichandran et al. |
| 8,022,260 | B2 | 9/2011 | O'Connor et al. |
| 2003/0047487 | A1 | 3/2003 | Ziebarth et al. |
| 2004/0110629 | A1 | 6/2004 | Stamires et al. |
| 2004/0111968 | A1 | 6/2004 | Day et al. |
| 2004/0151664 | A1 | 8/2004 | Auner |
| 2007/0173399 | A1 | 7/2007 | Lau et al. |
| 2008/0058563 | A1 | 3/2008 | Dumesic et al. |
| 2008/0093263 | A1 | 4/2008 | Cheng et al. |
| 2008/0210600 | A1 | 9/2008 | O'Connor et al. |
| 2008/0216391 | A1 | 9/2008 | Cortright et al. |
| 2009/0019770 | A1 | 1/2009 | Nacken et al. |
| 2009/0023971 | A1 | 1/2009 | Smith et al. |
| 2009/0090046 | A1 | 4/2009 | O'Connor et al. |
| 2009/0098032 | A1 | 4/2009 | Yang et al. |
| 2009/0227823 | A1 | 9/2009 | Huber et al. |
| 2009/0308787 | A1 | 12/2009 | O'Connor et al. |
| 2010/0010279 | A1 | 1/2010 | Kumar |
| 2010/0105970 | A1 | 4/2010 | Yanik et al. |
| 2010/0152024 | A1 | 6/2010 | Stamires et al. |
| 2010/0209965 | A1 | 8/2010 | O'Connor et al. |
| 2010/0298126 | A1 | 11/2010 | DeGraaf et al. |
| 2010/0298129 | A1 | 11/2010 | Liang et al. |
| 2011/0011721 | A1 | 1/2011 | Champagne |
| 2011/0167713 | A1 | 7/2011 | Quignard et al. |
| 2012/0117860 | A1 | 5/2012 | Brady et al. |
| 2012/0142520 | A1 | 6/2012 | Bartek et al. |
| 2012/0232299 | A1 | 9/2012 | Bartek et al. |
| 2013/0000183 | A1 | 1/2013 | Adkins et al. |
| 2013/0023710 | A1 | 1/2013 | Ravichandran et al. |
| 2013/0197291 | A1 | 8/2013 | Nesterenko et al. |
| 2013/0261355 | A1 | 10/2013 | Stamires |
| 2014/0007493 | A1 | 1/2014 | Henry et al. |
| 2014/0024866 | A1* | 1/2014 | Springs ............... C10G 1/086 585/240 |

FOREIGN PATENT DOCUMENTS

| | | |
|---|---|---|
| EP | 1852466 | 11/2007 |
| EP | 1852490 | 11/2007 |
| EP | 2017003 | 1/2009 |
| EP | 2105486 | 9/2009 |
| EP | 2107100 | 10/2009 |
| WO | WO0134295 | 5/2001 |
| WO | WO2004020093 | 3/2004 |
| WO | WO2007128799 | 11/2007 |
| WO | WO2008009643 | 1/2008 |
| WO | WO2008061305 | 5/2008 |
| WO | WO2009062386 | 5/2009 |
| WO | 2010012564 | 2/2010 |
| WO | WO2010062936 | 6/2010 |
| WO | WO2010065872 | 6/2010 |
| WO | WO2010111396 | 9/2010 |
| WO | WO2010123961 | 10/2010 |
| WO | WO2010124069 | 10/2010 |
| WO | WO2010129170 | 11/2010 |
| WO | WO2010135734 | 11/2010 |
| WO | WO2012122245 | 9/2012 |

OTHER PUBLICATIONS

McKEndry, P.; "Energy Production from Biomass (part 1); overview of Biomass" Bioresource Technology, 83(1): 37-46 (May 2002).

Wyman, et al.; "Coordinated Development of Leading Biomass Pretreatment Technologies" Bioresource Technology, 96(18): 1959-1966, (Dec. 2005).

Lappas, et al.; "Design, Construction, and Operation of a Transported Fluid Bed Process Development Unit for Biomass Fast Pyrolysis : Effect of Pyrolysis Temperature," Ind. Eng. Chem. Res., 47:742-747 (2000).

Samolada et al.; "Catalyst Evaluation for Catalytic Biomass Pyrolysis," Energy & Fuels, 14:1161-1167 (2000).

Lappas "Biomass pyrolysis in a circulating fluid bed reactor for the production of fuels and chemicals" Fuel 81:2087-2095, 2002.

Yuandong, et al.; "Recent Advances in Heavy Oil Hydroprocessing Technologies" Recent Patents on Chemical Engineering 2009, 2:22-36.

Aho, A, et al.; "Pyrolysis of Softwood Carbohydrates in a Fluidized Bed Reactor" Int J Mol.Sci Sep. 2008; 9(9): 1665-1675.

International Search Report for PCT Application No. PCT/US2013/51374; Filed on Jul. 9, 2013; dated Nov. 13, 2013; 4 pages.

CCPIT Office Action for Application No. 201380044791.1; Published May 6, 2015; dated Feb. 2, 2016.

European Search Report for Application No. 13819485.7; Published May 27, 2015; dated Feb. 12, 2016.

Viswanathan et al., "Surface properties of ZSM-5 modified by phosphorous," Catalysis Letter 22 1993, pp. 373-79.

* cited by examiner

PHOSPHOROUS PROMOTION OF ZEOLITE-CONTAINING CATALYSTS

CROSS REFERENCE TO RELATED APPLICATIONS/INCORPORATION BY REFERENCE STATEMENT

This application is a non-provisional application claiming benefit of U.S. Provisional Application No. 61/793,051, filed Mar. 15, 2013, which is hereby incorporated by reference in its entirety herein.

FIELD OF THE INVENTION

The present invention relates generally to zeolite-containing catalysts for use in catalytic cracking processes, and more particularly, to methods of promoting such catalysts with phosphorous, and further, to processes for using such catalysts in the thermo-catalytic conversion of biomass to bio-oil.

DESCRIPTION OF THE RELATED ART

With the rising costs and environmental concerns associated with fossil fuels, renewable energy sources have become increasingly important, and in particular, the production of renewable transportation fuels from the conversion of biomass feedstocks. Many different processes have been, and are being, explored for the conversion of biomass to biofuels and/or specialty chemicals. Some of the existing biomass conversion processes include, for example, combustion, gasification, slow pyrolysis, fast pyrolysis, liquefaction, and enzymatic conversion. The conversion products produced from these processes tend to be of low quality, containing high amounts of water and highly oxygenated hydrocarbonaceous compounds, making them difficult to separate into aqueous and hydrocarbonaceous phases. Also, these products usually require extensive secondary upgrading in order to be useful as transportation fuels.

Bio-oils produced from the thermo-catalytic conversion of biomass tend to be of better quality, with hydrocarbonaceous compounds having relatively low oxygen content, and which are generally separable by gravity separation into aqueous and hydrocarbonaceous phases.

While the use of conventional cracking catalysts, such as zeolite-containing FCC cracking catalysts, in the thermo-catalytic conversion of biomass can result in bio-oil products of superior quality to those produced from straight pyrolysis of biomass, such conventional catalytic systems can still suffer from insufficiently low yields, lower but still insufficiently high bio-oil oxygen levels, and elevated coke make. It has been found that catalysts prepared using phosphated zeolites can enhance catalyst performance in the conversion of biomass. However, pretreating the zeolite with phosphorous prior to incorporation of the zeolite into a catalyst composition results in an increase in both the complexity and cost of manufacturing such a catalyst, which in some cases can make such a catalyst cost prohibitive.

Accordingly, there remains a need for an improved catalyst including a phosphorous treated zeolite for the thermo-catalytic conversion of biomass which can be prepared in a more cost effective manner.

SUMMARY OF THE INVENTION

In accordance with an embodiment of the present invention, a method of making a phosphorous-promoted catalyst is provided and comprises:

a) preparing an aqueous slurry comprising a zeolite, and a binder precursor;
b) spray drying the aqueous slurry thereby gelling the binder precursor and forming particles from the aqueous slurry; and
c) promoting the particles with phosphorous forming the phosphorous-promoted catalyst. Further, the zeolite used in preparing the aqueous slurry in step a) is substantially phosphorous free.

In accordance with another embodiment of the present invention, a process for the conversion of particulate biomass is provided comprising: contacting the particulate biomass with phosphorous-promoted catalyst(s) prepared by the above method(s) at temperatures ranging from about 200 to about 1000° C., and in the substantial absence of oxygen.

DETAILED DESCRIPTION OF THE INVENTION

Figure 1:
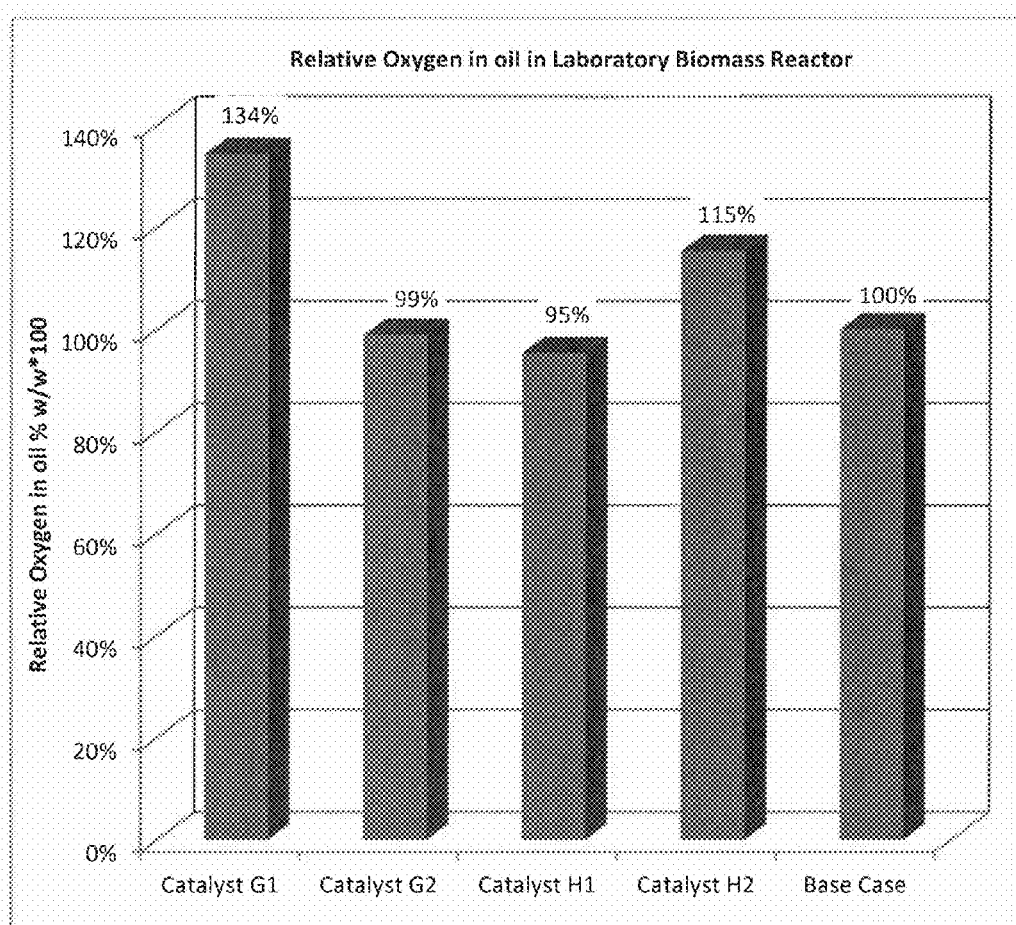
FIG. 1 is a plot showing relative oxygen in oil of bio-oils separately produced from the thermo-catalytic conversion of biomass in the presence of Catalysts G1, G2, H1, H2 and a Base Case.

Phosphorous-promoted catalyst(s) can be prepared by the method(s) described in the embodiments set out below, and can be in the form of particles. Such phosphorous-promoted catalyst(s) can comprise, consist of, or consist essentially of a binder, a zeolite, and phosphorous; and can also optionally comprise a matrix material.

In accordance with an embodiment of the invention, a phosphorous-promoted catalyst can be prepared by a method comprising:

a) preparing an aqueous slurry comprising a zeolite, and a binder precursor;
b) spray drying the aqueous slurry thereby gelling the binder precursor and forming particles from the aqueous slurry; and
c) promoting the particles with phosphorous forming the phosphorous-promoted catalyst.

The zeolites can be selected from the group consisting of ZSM-5, mordenite, beta, ferrierite, and zeolite-Y. The zeolite used in forming the aqueous slurry in step a) can also be substantially phosphorous free.

The binder precursor can be selected from the group consisting of a silica precursor, an alumina precursor, aluminum phosphate, and combinations thereof. The silica precursor can be selected from the group consisting of silicic acid, polysilicic acid, and combinations thereof.

The aqueous slurry can further comprise a matrix material, which can comprise a clay. The clay can be any clay suitable for use in a catalyst, and more specifically, can be kaolin. The phosphorous-promoted catalyst(s) prepared by such method can also be free of or substantially free of amorphous alumina.

The promotion of the particles with phosphorous in step c) can be by any method suitable for promoting a catalyst with phosphorous. More particularly, the promotion of the particles with phosphorous in step c) can comprise:

i) contacting the particles with an aqueous solution comprising a phosphorous compound thereby forming phosphorous-impregnated particles;

ii) separating the phosphorous-impregnated particles from the aqueous solution; and iii) drying the phosphorous-impregnated particles thereby forming the phosphorous-promoted catalyst.

The phosphorous compound can be selected from the group consisting of phosphoric acid, monoammonium phosphate, diammonium phosphate, triammonium phosphate, tetrasodium pyrophosphate, and combinations thereof. The drying of the phosphorous-impregnated particles in step iii) can be at a temperature in the range of from about 40° C. to about 150° C., or from about 40° C. to about 140° C., or from about 50° C. to about 130° C. and for a time period in the range of from about 0.05 hour to about 24 hours, or from about 0.1 hour to about 24 hours, or from about 0.1 hour to about 12 hours, or from about 0.5 hour to about 6 hours. The phosphorous-promoted catalyst can also be calcined. Such calcination of the phosphorous-promoted catalyst can be at a temperature in the range of from about 200° C. to about 800° C., or from about 300° C. to about 800° C., or from about 300° C. to about 600° C., and for a time period in the range of from about 0.1 hour to about 24 hours, or from about 0.1 hour to about 12 hours, or from about 0.5 hour to about 6 hours.

In accordance with an embodiment of this invention, hydrocarbonaceous feeds, such as hydrocarbons and biomass, can be converted to products in the presence of any of the phosphorous-promoted catalysts prepared in accordance with the above described method(s).

The biomass material useful in the invention described herein can be any biomass capable of being converted to liquid and gaseous hydrocarbons.

Preferred are solid biomass materials comprising a cellulosic material, in particular lignocellulosic materials, because of the abundant availability of such materials, and their low cost. The solid biomass feed can comprise components selected from the group consisting of lignin, cellulose, hemicelluloses, and combinations thereof. Examples of suitable solid biomass materials include forestry wastes, such as wood chips and saw dust; agricultural waste, such as straw, corn stover, sugar cane bagasse, municipal waste, in particular yard waste, paper, and card board; energy crops such as switch grass, coppice, eucalyptus; and aquatic materials such as algae; and the like.

The biomass can be thermo-catalytically converted at elevated temperatures in a conversion reactor containing any of the phosphorous-promoted catalyst(s) prepared by the method(s) described above to thereby produce a conversion reactor effluent comprising vapor conversion products and the catalyst. The conversion reactor effluent can also include unreacted biomass, coke, or char. The vapor conversion products comprise, consist of, or consist essentially of bio-oil and water. The conversion reactor can be operated at a temperature in the range of from about 200° C. to about 1000° C., or between about 250° C. and about 800° C. The conversion reactor can also be operated in the substantial absence of oxygen.

At least a portion of the vapor conversion products can be separated from the conversion reactor effluent, and at least a portion of the vapor conversion products thus separated can be condensed to form a condensate comprising bio-oil and water. The condensate is generally separable by gravity separation into the bio-oil and into an aqueous phase comprising water.

Optionally, at least a portion of the bio-oil can be separated from the condensate, also forming the aqueous phase comprising water and less than about 25 wt %, or less than about 15 wt % hydrocarbonaceous compounds. Such separation can be by any method capable of separating bio-oil from an aqueous phase, and can include, but is not limited to, centrifugation, membrane separation, gravity separation, and the like. Preferably, if separated, the condensate is separated by gravity separation in a settling vessel into the bio-oil and into the aqueous phase. The oxygen levels of the produced bio-oils can be less than about 20 wt % on a dry basis, or between about 4 to about 18 wt % on a dry basis.

EXAMPLES

ZSM-5 Slurry Preparation

ZSM-5 powder was slurried in water at 35% solids.

ZSM-5 Slurry Phosphorous Pretreatment (P-ZSM-5 Preparation)

Aqueous $H_3PO_4$ (56-85 wt % on a dry $H_3PO_4$ basis) was added to the ZSM-5 slurry. The components were mixed for 5 minutes and pH was checked to be in the range of 1.8-2.5.

The pH of the slurry was adjusted to pH 4.0±0.2 with ammonium hydroxide solution ($NH_4OH$ 29 wt %). For example, for a 50 kg batch size about 1.3 kg $NH_4OH$ was used. The slurry was mixed for 15 minutes. The final slurry density was about 1.2 g/ml.

The slurry was spray dried, and the resulting phosphated powder was calcined at 600° C. The calcined P-ZSM-5 contained about 9 wt % $P_2O_5$, based on the dry basis weight of the ZSM-5.

The calcined P-ZSM-5 was re-slurried in water at 35% solids and thoroughly milled and dispersed using a bead mill, forming a P-ZSM-5 slurry. The D50 was less than about 3.5 μm.

Binder Preparation (Polysilicic Acid—PSA)

A 20 kg quantity of a 20 wt % sodium silicate solution was prepared by diluting a quantity of sodium silicate (29 wt %) with sufficient deionized water.

The sodium silicate solution was contacted with ion exchange resin beads to exchange the sodium ions of the sodium silicate with $H^+$ ions on the beads. The resulting PSA solution was substantially sodium free. The resulting pH of the PSA binder solution was about 1.4.

Example 1

Catalyst Preparation

A 79.3 g quantity of the PSA binder was added to a mix tank. In a separate vessel, 33 g of tetrasodium pyrophosphate were dissolved in 40.8 kg of the ZSM-5 slurry (28 wt % solids) and then added to the PSA binder in the mix tank. A 10.8 kg quantity of kaolin clay was added and the mixture was then spray dried to form Catalyst GH.

Catalyst G1 Preparation

A 1500 g quantity of Catalyst GH was wet impregnated with 284.8 g of 57% phosphoric acid, diluted with 132.53 g D.I. water. The product was then dried overnight at 110° C. and calcined for 4 hours at 600° C., forming Catalyst G1.

Catalyst G2 Preparation

A 1500 g quantity of Catalyst GH was wet impregnated with 190.49 g mono ammonium phosphate (MAP) dissolved in 226.8 g water. This product was then dried overnight at 110° C. and calcined for 4 hours at 600° C., forming Catalyst G2.

Catalyst H1 Preparation

A 1500 g quantity of Catalyst GH was wet impregnated with 142.4 g of 57% phosphoric acid, diluted with 274.9 g D.I. water. The product was then dried overnight at 110° C. and calcined for 4 hours at 600° C., forming Catalyst H1.

Catalyst H2 Preparation

A 1500 g quantity of Catalyst GH was wet impregnated with 95.2 g MAP dissolved in 322.1 g water. This product was then dried overnight at 110° C. and calcined for 4 hours at 600° C., forming Catalyst H2.

Base Case Catalyst Preparation

A 28.64 kg quantity of PSA binder (containing 10.75% SiO2) was diluted with 5.16 kg of deionized water. In a separate vessel, 189 g of 29% NH4OH and 13 g of tetrasodium pyrophosphate were added to 12.06 g of P-ZSM-5 slurry (36.47 wt % solids) forming a zeolite mixture. The zeolite mixture was added to the binder mixture. A 4.12 kg quantity of kaolin clay was then added and the resulting mixture was spray dried, forming the Base Case Catalyst.

Example 2

Catalyst Characterization

Fresh samples of catalysts G1, G2, H1, H2, and Base Case were calcined at 600° C. and analyzed for various properties, the results of which are shown in Table 1 below. For Loss on Ignition, the samples were subjected to such testing without the intermediate 600° C. calcination.

TABLE 1

| Property | Method | Catalyst G1 | Catalyst G2 | Catalyst H1 | Catalyst H2 | Base Case |
|---|---|---|---|---|---|---|
| Attrition Index | ASTM D5757 | 3.17 | 3.22 | 4.04 | 3.69 | 2.86 |
| Total Surface Area (TSA) | BET plot, P/P0 = 0.01-0.10 | 70.8 | 126.7 | 136.1 | 134.4 | 120.3 |
| Meso Surface Area (MSA) | t-plot, 3.5-5.0 Å | — | 26.8 | 22 | 23.1 | 17.2 |
| Micro Surface Area (ZSA | ZSA = TSA − MSA | 68.8 | 99.9 | 114.1 | 111.3 | 103.1 |
| Loss on Ignition | TGA Method | 6.66 | 6.56 | 5.18 | 6.18 | 6.81 |

Example 3

Biomass Conversion Using Catalysts G1, G2, H1, H2, and Base Case in a Laboratory Scale Biomass Conversion Batch Testing Unit Each of the catalysts G1, G2, H1, H2, and Base Case were separately used as catalysts in the thermo-catalytic conversion of southern yellow pine wood chips in a laboratory scale biomass conversion batch testing unit. The unit temperatures for the runs were each about 500° C. All runs were in the substantial absence of free oxygen. After separation of the product gases and vapors from the catalyst, the condensable portion of the product stream was condensed and allowed to gravity separate into aqueous and bio-oil phases.

FIG. 1 shows relative oxygen in oil for each of catalysts G1, G2, H1, H2, and Base Case, all relative to the oxygen in oil for the Base Case Catalyst. Catalysts G2 and H1 had lower relative oxygen in oil as compared to the Base Case Catalyst, and the relative oxygen in oil for Catalyst H2 was only slightly higher than that for the Base Case Catalyst.

Figure 2:
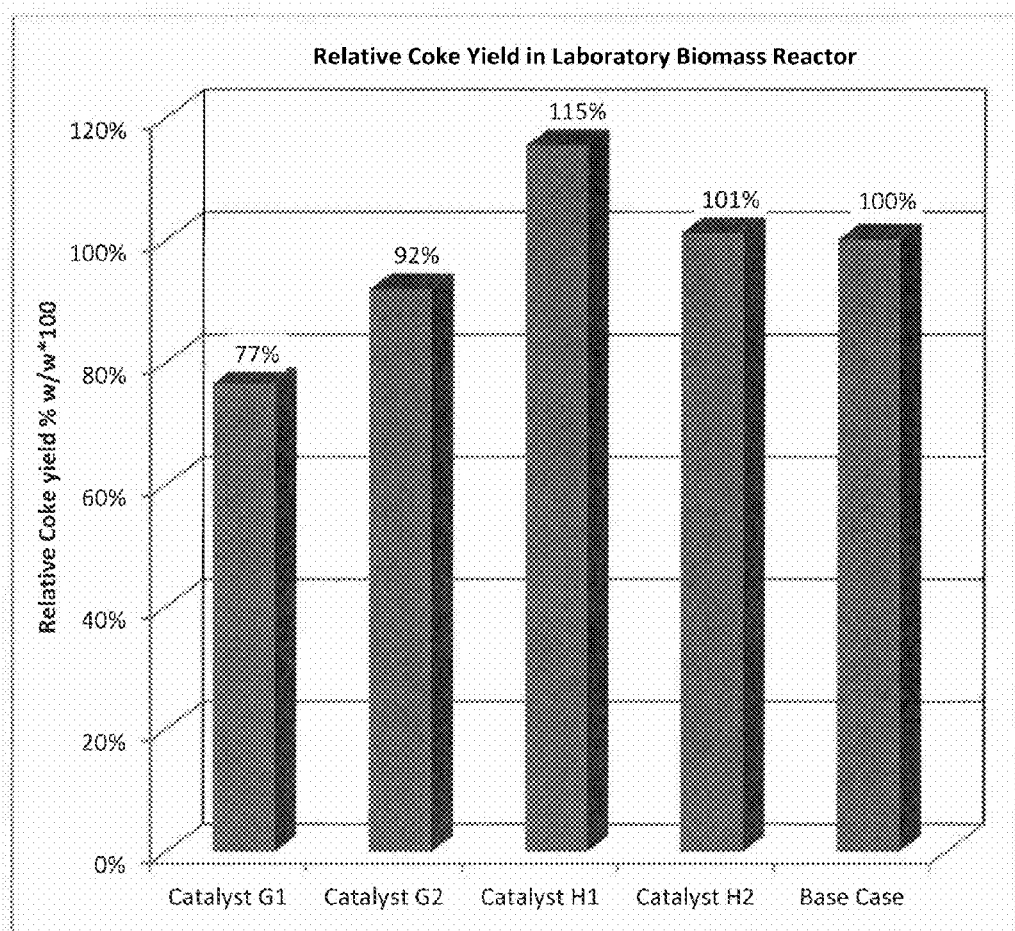
FIG. 2 is a plot showing relative coke of bio-oils separately produced from the thermo-catalytic conversion of biomass in the presence of Catalysts G1, G2, H1, H2 and a Base Case.

FIG. 2 shows relative coke for each of Catalysts G1, G2, H1, H2, and Base Case, all relative to the coke make for the Base Case Catalyst. Catalysts G1, G2 and H2 had similar or superior coke selectivity as compared to the Base Case Catalyst, with Catalyst H1 having only slightly higher coke make as compared to the Base Case Catalyst.

Figure 3:
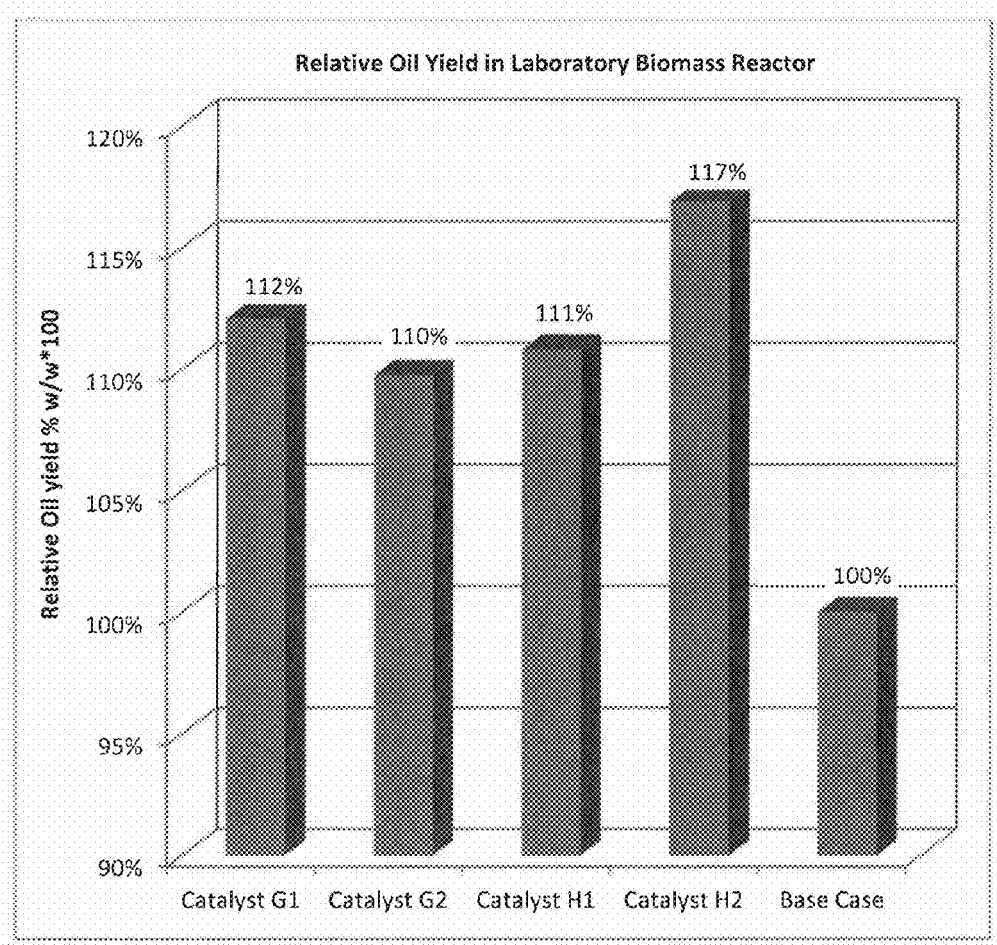
FIG. 3 is a plot showing relative oil yield of bio-oils separately produced from the thermo-catalytic conversion of biomass in the presence of Catalysts G1, G2, H1, H2 and a Base Case.

FIG. 3 shows relative oil yield for each of Catalysts G1, G2, H1, H2, and Base Case, all relative to the oil yield for the Base Case Catalyst. Each of the Catalysts G1, G2, H1, and H2 had much higher relative oil yield as compared to the oil yield of the Base Case Catalyst.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

Further, unless expressly stated otherwise, the term "about" as used herein is intended to include and take into account variations due to manufacturing tolerances and/or variabilities in process control.

Changes may be made in the construction and the operation of the various components, elements and assemblies described herein, and changes may be made in the steps or sequence of steps of the methods described herein without departing from the spirit and the scope of the invention as defined in the following claims.

What is claimed is:

1. A method of making a phosphorous-promoted catalyst comprising:
   a) preparing an aqueous slurry comprising a zeolite and a binder precursor selected from the group consisting of an alumina precursor, aluminum phosphate, and combinations thereof;
   b) spray drying said aqueous slurry thereby gelling said binder precursor and forming particles from said aqueous slurry; and
   c) promoting said particles with phosphorous forming said phosphorous-promoted catalyst.

2. The method of claim 1 wherein said promoting of said particles with phosphorous in step c) comprises:
   i) contacting said particles with an aqueous solution comprising a phosphorous compound thereby forming phosphorous-impregnated particles;
   ii) separating said phosphorous-impregnated particles from said aqueous solution; and iii) drying said phosphorous-impregnated particles thereby forming said phosphorous-promoted catalyst.

3. The method of claim 2 wherein said phosphorous compound is selected from the group consisting of phosphoric acid, monoammonium phosphate, diammonium phosphate, triammonium phosphate, tetrasodium pyrophosphate, and combinations thereof.

4. The method of claim 2 wherein said drying of said phosphorous-impregnated particles in step iii) is at a temperature in the range of from about 40° C. to about 150° C., and for a time period in the range of from about 0.05 hours to about 24 hours.

5. The method of claim 1 wherein said aqueous slurry further comprises a matrix material.

6. The method of claim 5 wherein said matrix material comprises clay.

7. The method of claim 6 wherein said clay comprises kaolin, and said catalyst is free of or substantially free of amorphous alumina.

8. The method of claim 1 wherein said zeolite used in preparing said aqueous slurry in step a) comprises ZSM-5.

9. The method of claim 1 wherein said zeolite used in preparing said aqueous slurry in step a) is substantially phosphorous free.

10. The method of claim 1 wherein said phosphorous-promoted catalyst is calcined to form a calcined catalyst.

11. A phosphorous-promoted catalyst prepared by the method of claim 1.

12. A process for the conversion of particulate biomass comprising contacting said particulate biomass with the phosphorous-promoted catalyst of claim 1 at temperatures ranging from about 200° C. to about 1000° C., and in the substantial absence of oxygen.

* * * * *